(12) United States Patent
Chong et al.

(10) Patent No.: US 7,806,723 B2
(45) Date of Patent: Oct. 5, 2010

(54) ELECTRICAL GROMMET DEVICE

(75) Inventors: Joseph Chong, Simi Valley, CA (US); Yoko Iida, Tokyo (JP); Kenneth Mori, Los Angeles, CA (US)

(73) Assignee: Belkin International, Inc., Playa Vista, CA (US)

( * ) Notice: Subject to any disclaimer, the term of this patent is extended or adjusted under 35 U.S.C. 154(b) by 0 days.

(21) Appl. No.: 11/969,607

(22) Filed: Jan. 4, 2008

(65) Prior Publication Data

US 2008/0200064 A1 Aug. 21, 2008

Related U.S. Application Data

(60) Provisional application No. 60/878,874, filed on Jan. 5, 2007.

(51) Int. Cl.
*H01R 13/73* (2006.01)
(52) U.S. Cl. ...................................................... 439/571
(58) Field of Classification Search .................. 439/571, 439/357, 284, 638; 411/508; 248/214; 16/2; 361/752; 174/153 G
See application file for complete search history.

(56) References Cited

U.S. PATENT DOCUMENTS

| | | | |
|---|---|---|---|
| 3,990,763 A | 11/1976 | Kress | |
| 4,119,359 A | 10/1978 | Schultz | |
| 4,401,351 A | 8/1983 | Record | |
| 4,453,059 A * | 6/1984 | Fukushima | 200/296 |
| 4,501,460 A | 2/1985 | Sisler | |
| 4,558,914 A | 12/1985 | Prager et al. | |
| 4,688,491 A | 8/1987 | Herrera et al. | |
| 4,688,864 A | 8/1987 | Sorel | |
| 4,792,881 A * | 12/1988 | Wilson et al. | 361/827 |
| D301,713 S | 6/1989 | Bolan et al. | |
| 4,845,589 A | 7/1989 | Weidler et al. | |

(Continued)

FOREIGN PATENT DOCUMENTS

DE 10122123 A1 12/2002

(Continued)

OTHER PUBLICATIONS

Internet: The Digital Satellite, |http://www.thedigitalsatellite.com; retrieved from the internet on Oct. 5, 2004 (13 pgs.).

(Continued)

*Primary Examiner*—Alexander Gilman
(74) *Attorney, Agent, or Firm*—Bryan Cave LLP

(57) ABSTRACT

Embodiments of electrical grommet devices, and methods of use and manufacture are generally described herein. In one exemplary embodiment, an electrical device comprises a casing comprising: a grommet comprising one or more first apertures and an insertion portion; and a connection mechanism capable of being coupled to the grommet. The electrical device further comprises one or more electrical components located at least partially within the casing, and one or more electrical connectors located at least partially within the casing and coupled to the one or more electrical components. The insertion portion of the grommet can be removably placed in a grommet hole from a first side of the grommet hole, and the grommet can be removably coupled to the connection mechanism at a second side of the grommet hole opposite the first side.

35 Claims, 6 Drawing Sheets

U.S. PATENT DOCUMENTS

| | | | |
|---|---|---|---|
| 4,850,485 A | 7/1989 | Ishikawa | |
| 4,864,078 A | 9/1989 | Bowman | |
| D313,340 S | 1/1991 | Stathis et al. | |
| 5,030,128 A | 7/1991 | Herron et al. | |
| 5,231,562 A * | 7/1993 | Pierce et al. | 361/832 |
| 5,247,406 A | 9/1993 | Apple et al. | |
| 5,333,097 A | 7/1994 | Christensen et al. | |
| 5,336,102 A | 8/1994 | Cairns et al. | |
| D350,944 S | 9/1994 | Shewmon et al. | |
| 5,358,420 A | 10/1994 | Cairns et al. | |
| D354,903 S | 1/1995 | Mockett | |
| 5,381,315 A | 1/1995 | Hamaguchi et al. | |
| D355,416 S | 2/1995 | McCay et al. | |
| D358,980 S | 6/1995 | Mockett | |
| 5,440,181 A | 8/1995 | Gruender, Jr. et al. | |
| D362,663 S | 9/1995 | Nguyen | |
| D365,333 S | 12/1995 | Mihalik et al. | |
| D366,455 S | 1/1996 | Cheng | |
| 5,483,419 A | 1/1996 | Kaczeus, Sr. et al. | |
| 5,498,174 A | 3/1996 | Speer et al. | |
| 5,515,239 A | 5/1996 | Kamerman et al. | |
| D375,909 S | 11/1996 | Dziersk et al. | |
| 5,575,873 A * | 11/1996 | Pieper et al. | 156/153 |
| 5,586,002 A | 12/1996 | Notarianni | |
| 5,591,048 A | 1/1997 | Hahn | |
| 5,604,662 A | 2/1997 | Anderson et al. | |
| 5,621,890 A | 4/1997 | Notarianni et al. | |
| D379,972 S | 6/1997 | Mihalik et al. | |
| 5,645,434 A | 7/1997 | Leung | |
| 5,673,172 A | 9/1997 | Hastings et al. | |
| 5,692,400 A | 12/1997 | Bliven et al. | |
| 5,700,159 A | 12/1997 | Albeck | |
| 5,706,179 A | 1/1998 | Palatov | |
| D391,944 S | 3/1998 | Han | |
| D392,147 S | 3/1998 | Gervais et al. | |
| 5,726,922 A | 3/1998 | Womble et al. | |
| D393,451 S | 4/1998 | Faranda et al. | |
| 5,737,189 A | 4/1998 | Kammersgard et al. | |
| 5,772,456 A | 6/1998 | Ohishi | |
| 5,777,845 A | 7/1998 | Krum et al. | |
| RE35,915 E | 10/1998 | Hastings et al. | |
| 5,822,184 A | 10/1998 | Rabinovitz | |
| 5,825,618 A | 10/1998 | Schnoor et al. | |
| 5,835,353 A | 11/1998 | Dalby | |
| D406,102 S * | 2/1999 | Byrne | D13/139.4 |
| 5,871,368 A | 2/1999 | Erdner et al. | |
| 5,875,094 A | 2/1999 | Kirkendoll | |
| D408,012 S | 4/1999 | Brownlie | |
| 5,896,273 A | 4/1999 | Varghese et al. | |
| D411,989 S | 7/1999 | Grossman et al. | |
| D412,322 S | 7/1999 | Wu | |
| D412,494 S | 8/1999 | Tamaki et al. | |
| 5,938,473 A | 8/1999 | Nishio et al. | |
| 5,940,319 A | 8/1999 | Durlam et al. | |
| D413,893 S | 9/1999 | Luzbetak et al. | |
| 5,956,267 A | 9/1999 | Hurst et al. | |
| D415,741 S | 10/1999 | Lee et al. | |
| D416,007 S | 11/1999 | Cavello | |
| D416,559 S | 11/1999 | Hoyt et al. | |
| 6,018,456 A | 1/2000 | Young et al. | |
| D419,978 S | 2/2000 | Mah | |
| 6,024,599 A | 2/2000 | Stathis et al. | |
| D421,962 S | 3/2000 | Varga | |
| 6,042,426 A | 3/2000 | Byrne | |
| D422,267 S | 4/2000 | Richards | |
| D423,010 S | 4/2000 | Wicks | |
| 6,047,572 A | 4/2000 | Bliven et al. | |
| 6,050,849 A | 4/2000 | Chang | |
| 6,052,278 A | 4/2000 | Tanzer et al. | |
| D425,866 S | 5/2000 | Nagasawa et al. | |
| 6,073,188 A | 6/2000 | Fleming | |
| 6,076,142 A | 6/2000 | Corrington et al. | |
| 6,098,131 A | 8/2000 | Unger et al. | |
| 6,108,198 A | 8/2000 | Lin | |
| 6,141,221 A | 10/2000 | Tong et al. | |
| 6,147,859 A | 11/2000 | Abboud | |
| 6,153,443 A | 11/2000 | Durlam et al. | |
| D435,558 S | 12/2000 | Tong et al. | |
| D436,109 S | 1/2001 | Tong et al. | |
| 6,174,737 B1 | 1/2001 | Durlam et al. | |
| 6,211,090 B1 | 4/2001 | Durlam et al. | |
| 6,234,812 B1 | 5/2001 | Ivers et al. | |
| D444,462 S | 7/2001 | Tsuji | |
| 6,254,427 B1 * | 7/2001 | Stathis | 439/535 |
| D450,686 S | 11/2001 | Beaumont et al. | |
| 6,331,938 B1 | 12/2001 | Hsieh et al. | |
| 6,349,036 B1 | 2/2002 | Chang et al. | |
| 6,374,455 B1 * | 4/2002 | Regele et al. | 16/2.1 |
| D458,608 S | 6/2002 | Tong et al. | |
| 6,416,336 B1 | 7/2002 | Schulte et al. | |
| 6,430,084 B1 | 8/2002 | Rizzo et al. | |
| 6,430,085 B1 | 8/2002 | Rizzo | |
| D462,689 S | 9/2002 | Moran | |
| D465,223 S | 11/2002 | Milan | |
| 6,492,591 B1 | 12/2002 | Metcalf | |
| 6,052,278 C1 | 5/2003 | Tanzer et al. | |
| D475,996 S | 6/2003 | Skulley | |
| 6,607,408 B2 | 8/2003 | Milan | |
| 6,609,928 B1 | 8/2003 | Le | |
| 6,650,549 B1 | 11/2003 | Chiao | |
| 6,669,513 B2 | 12/2003 | Huang | |
| 6,716,047 B2 | 4/2004 | Milan | |
| 6,720,597 B2 | 4/2004 | Janesky et al. | |
| 6,722,917 B2 | 4/2004 | Huang | |
| D500,497 S | 1/2005 | Yu et al. | |
| 6,905,374 B2 | 6/2005 | Milan | |
| D510,091 S | 9/2005 | Mori et al. | |
| D512,718 S | 12/2005 | Mori et al. | |
| 6,983,341 B1 | 1/2006 | Lim et al. | |
| 2003/0225954 A1 | 12/2003 | Wu | |
| 2004/0026103 A1 | 2/2004 | Henriott et al. | |
| 2004/0234254 A1 | 11/2004 | Czupich et al. | |
| 2005/0047099 A1 | 3/2005 | Mori et al. | |
| 2005/0094355 A1 | 5/2005 | Mori et al. | |
| 2005/0282417 A1 | 12/2005 | Tsao | |
| 2006/0258195 A1 | 11/2006 | Schwartz et al. | |
| 2008/0142504 A1 * | 6/2008 | Byrne | 219/452.11 |

FOREIGN PATENT DOCUMENTS

| | | |
|---|---|---|
| DE | 102004002838 A1 | 4/2005 |
| GB | 2350032 | 11/2000 |
| JP | 08112144 | 5/1996 |
| JP | 08148231 | 6/1996 |
| JP | 2000-163168 | 6/2000 |
| JP | D1076124 | 6/2000 |
| JP | D1076125 | 6/2000 |
| JP | 2000-231969 | 8/2000 |
| JP | 2000-311168 | 11/2000 |
| JP | 2001-102136 | 4/2001 |
| JP | D1076992 | 7/2006 |
| JP | D1278194 | 8/2006 |

OTHER PUBLICATIONS

Internet: Power & Data Round Desktop Grommet w/ Brush—PCS1B; retrieved from the internet on Jan. 11, 2005; |http://www.mockett.com/print.asp?ID=4&ation=detail&partCode=PCS1B|.

Internet: Power & Communications Mini Flip-Up Grommet PCS4A; retrieved from the internet on Jan. 11, 2005; |http://www.mockett.com/print.asp?ID=4&ation=detail&partCode=PCS4A|.

Internet: Power & Communications Large Capacity Rectangular Grommet; retrieved from the internet on Jan. 11, 2005; |http://www.mockett.com/print.asp?ID=4&ation=detail&partCode=PCS17|.

Internet: Power & Communications inch El Grande inch Grommet PCS18; retrieved from the internet on Jan. 11, 2005; http://www.mockett.com/print.asp?ID=4&action=detail&partCode=PCS18.

Internet: Power & Communications Spring-Loaded Grommet, No Cap PCS19; retrieved from the internet on Jan. 11, 2005; |http://www.mockett.com/print.asp?ID=4&ation=detail&partCode=PCS19|.

Internet: Power & Communications Clamp-On Grommet-PCS14; retrieved from the internet on Jan. 11, 2005; |http://www.mockett.com/print.asp?ID=4&action=detail&partCode=PCS14|.

Internet: Power & Communications Grommet PCS24; retrieved from the internet on Jan. 11, 2005; |http://www.mockett.com/print.asp?ID=4&ation=detail&partCode=PCS24|.

Internet: Power & Communications Grommet PCS25; retrieved from the internet on Jan. 11, 2005; |http://www.mockett.com/print.asp?ID=4&ation=detail&partCode=PCS25|.

Internet: Power & Communications Grommet PCS26; retrieved from the internet on Jan. 11, 2005; |http://www.mockett.com/print.asp?ID=4&param=gzCart_products.categoryID&data=PCS26|; 2 pgs.

Internet: Power & Communications Grommet PCS27; retrieved from the internet on Jan. 11, 2005; |http://www.mockett.com/print.asp?ID=4&param=gzCart_products.categoryID&data=PCS27|; 2 pgs.

Internet: Round Power & Communications Grommet PCS1; retrieved from the internet on Jan. 11, 2005; |http://www.mockett.com/print.asp?ID=4&param=gzCart_products.categoryID&data=PCS1|.

Internet: Power & Communications Small Oval Grommet PCS2; retrieved from the internet on Jan. 11, 2005; |http://www.mockett.com/print.asp?ID=4&param=gzCart_products.categoryID&data=PCS2|.

Internet: Power & Communications Large Oval Grommet PCS3; retrieved from the internet on Jan. 11, 2005; |http://www.mockett.com/print.asp?ID=4&action=detail&partCode=PCS|.

Internet: Power & Communications Grommet PCS4; retrieved from the internet on Jan. 11, 2005; 2 pgs; |http://www.mockett.com/print.asp?ID=4&param=gzCart_products.seriesID&data=pcs4|.

Internet: Power & Communications Low-Profile Grommet-PCS12; retrieved from the internet on Jan. 11, 2005; |http://www.mockett.com/print.asp?ID=4&action=detail&partCode=PCS12|.

Internet: Power & Communications Small Low-Profile Grommet-PCS13; retrieved from the internet on Jan. 11, 2005; |http://www.mockett.com/print.asp?ID=4&action=detail&partCode=PCS13|.

Internet: Power & Communications Large Rectangular Grommet PCS5; retrieved from the internet on Jan. 11, 2005; |http://www.mockett.com/print.asp?ID=4&action=detail&partCode=PCS5|.

Internet: Power Pylon—PCS6; retrieved from the internet on Jan. 11, 2005; |http://www.mockett.com/print.asp?id=4&param=gzCart_products.CategoryID&data=PCS6|.

Internet: Power & Communications Flush-Mount Square Grommet—PCS7; retrieved from the internet on Jan. 11, 2005; |http://www.mockett.com/print.asp?ID=4&action=detail&partCode=PCS7|.

Internet: Power & Communications Flush-Mount Rectangular Grommet—PCS8; retrieved from the internet on Jan. 11, 2005; |http://www.mockett.com/print.asp?ID=4&action=detail&partCode=PCS8|.

Internet: Power & Communications Flush-Mount Extra Large Rectangular Grommet—PCS9; retrieved from the internet on Jan. 11, 2005; |http://www.mockett.com/print.asp?ID=4&action=detail&partCode=PCS9|.

Internet: Power & Communications Under-Desk Grommet-PCS10; retrieved from the internet on Jan. 11, 2005; |http://www.mockett.com/print.asp?ID=4&action=detail&partCode=PCS10|.

Internet: Power & Communications Large Under-Desk Grommet-PCS11; retrieved from the internet on Jan. 11, 2005; |http://www.mockett.com/print.asp?ID=4&action=detail&partCode=PCS11|.

Internet: Power & Communications Versatile Mount Grommet-PCS20 ; retrieved from the internet on Jan. 11, 2005; |http://www.mockett.com/print.asp?ID=4&action=detail&partCode=PCS20|.

Internet: Power & Communications Adjustable Clamp Grommet-PCS21; retrieved from the internet on Jan. 11, 2005; |http://www.mockett.com/print.asp?ID=4&action=detail&partCode=PCS21|.

Internet: Power & Communications Large Power Pylon-PCS22; retrieved from the internet on Jan. 11, 2005; |http://www.mockett.com/print.asp?ID=4&action=details&partCode=PCS22|.

* cited by examiner

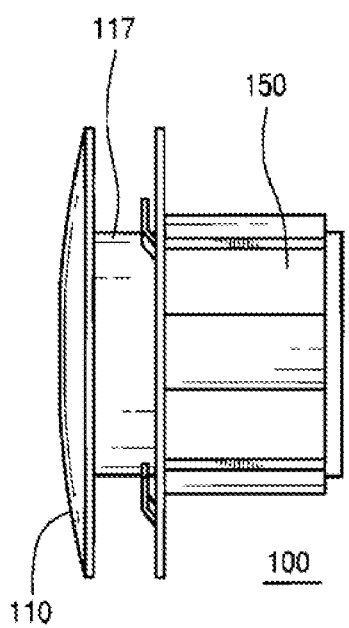
FIG. 2
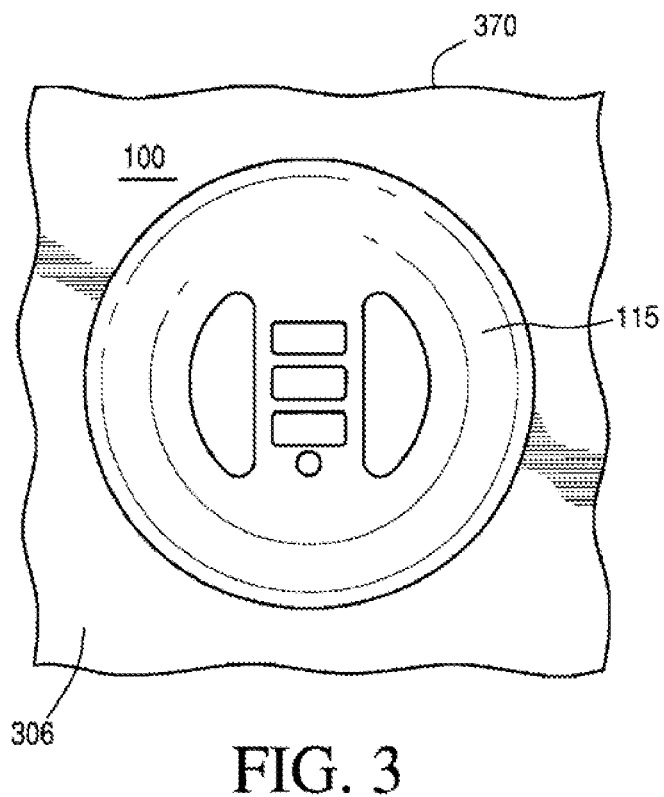
FIG. 3
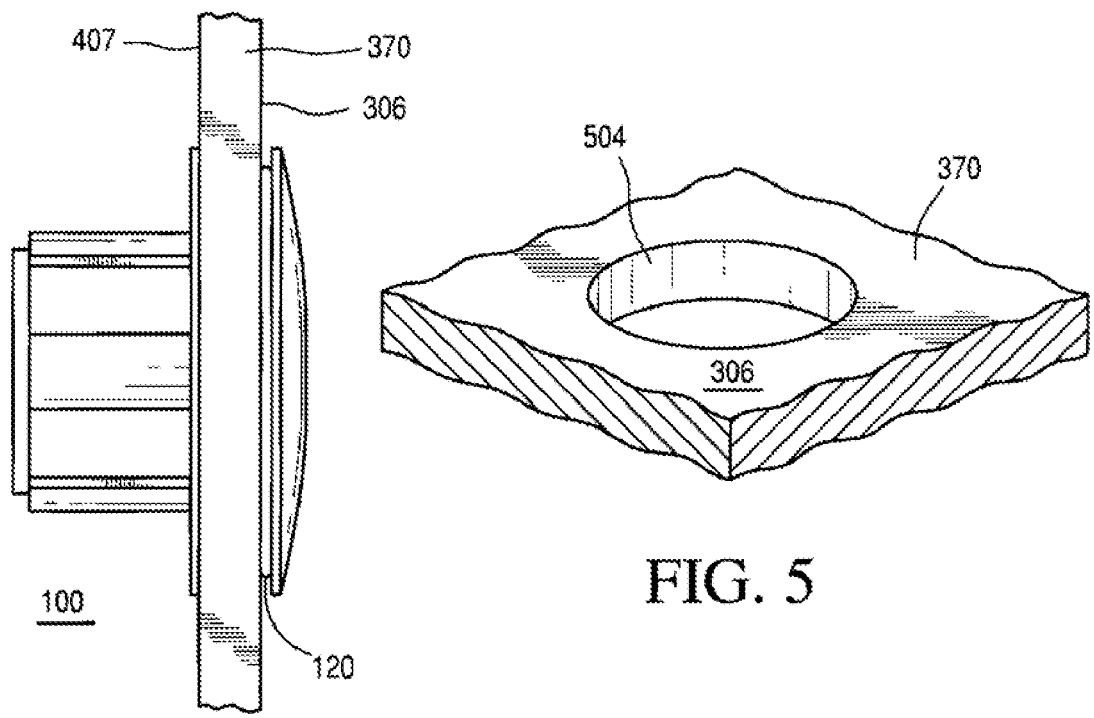
FIG. 4
FIG. 5

ELECTRICAL GROMMET DEVICE

CROSS REFERENCE TO RELATED APPLICATIONS

This non-provisional patent application claims priority from U.S. Patent Application Ser. No. 60/878,874, filed Jan. 5, 2007, and U.S. patent application Ser. No. 11/127,336, filed on May 11, 2005, and both applications are hereby incorporated by reference.

TECHNICAL FIELD

This disclosure relates generally to grommets and more particularly to grommets having electronic components.

BACKGROUND

The management of various cables, cords, and wires found on a typical work surface is an ongoing challenge. Almost all of the increasing number of available devices, including telephones, computers and their many peripheral devices, digital cameras, personal digital assistants (PDAs), and so forth, use at least one and often multiple cables to transfer data, receive power, and/or perform other functions. Without some sort of management system, the number of cables on a desktop can quickly become a tangled mess that is both unsightly and unwieldy.

The increase in the number of peripheral and other devices has led to the introduction of connection hubs, which are units having multiple connection ports contained in a single housing. Accordingly, there exists a need for a connectivity system that both increases the available connection options on a desktop and also improves cable management.

BRIEF DESCRIPTION OF THE DRAWINGS

FIG. 2 illustrates a side view of the electrical device, according to the first embodiment;

FIG. 3 illustrates a top view of the electrical device when the electrical device is installed in a grommet hole, according to the first embodiment;

FIG. 4 illustrates a side view of the electrical device when the electrical device is installed in the grommet hole, according to the first embodiment;

FIG. 5 illustrates a top, right, front perspective view of a portion of an exemplary table structure configured to accommodate various embodiments of an electrical device;

Figure 1:
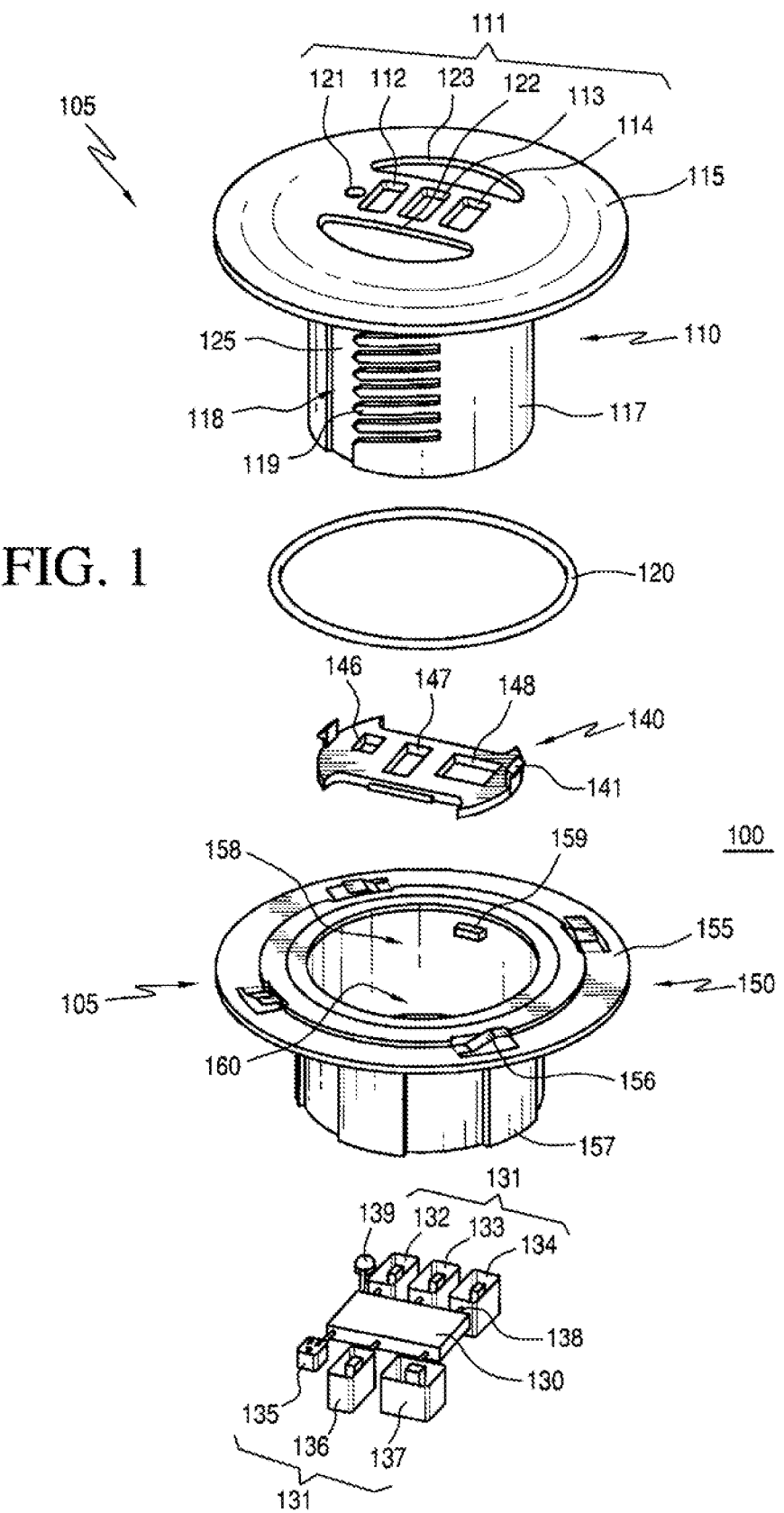
FIG. 1 illustrates an exploded view of an electrical device, according to a first embodiment.

For simplicity and clarity of illustration, the drawing figures illustrate the general manner of construction. Descriptions and details of well-known features and techniques may be omitted to avoid unnecessarily obscuring the illustrated exemplary embodiments of the invention. Additionally, elements in the drawing figures are not necessarily drawn to scale. For example, the dimensions of some of the elements in the figures may be exaggerated relative to other elements to help improve understanding of exemplary embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the exemplary embodiments of the invention described herein are, for example, capable of operation in sequences other than those illustrated or otherwise described herein. Furthermore, the terms "include," "have," and any variations thereof, are intended to cover a non-exclusive inclusion, such that a process, method, article, device, system, or apparatus that comprises a list of elements is not necessarily limited to those elements, but may include other elements not expressly listed or inherent to such process, method, article, device, system, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, mechanical, or other manner.

DESCRIPTION OF EXAMPLES OF EMBODIMENTS

In one exemplary embodiment, an electrical device comprises: a casing comprising a grommet comprising one or more first apertures and an insertion portion. The casing also comprises a connection mechanism capable of being coupled to the grommet. The electrical device further comprises one or more electrical components located at least partially within the casing, and one or more electrical connectors located at least partially within the casing and coupled to the one or more electrical components. The insertion portion of the grommet can be removably placed in a grommet hole from a first side of the grommet hole, and when the grommet is at the first side of the grommet hole and the insertion portion is in the grommet hole, the grommet can be removably coupled to the connection mechanism at a second side of the grommet hole opposite the first side.

In another embodiment, a connectivity system capable of use with a desk having a surface containing an aperture, comprises: a connection mechanism configured to be located below the aperture and comprising a collar having an interior region; and a connection hub capable of being inserted into the aperture and the interior region of the collar. The connection hub comprises: a top region; a bottom region opposition the top region; a first connection port located at the top region; and a second connection port located at the bottom region.

Among various exemplary embodiments, a method for using an electrical device comprises providing a grommet comprising: one or more first apertures, one or more electrical components accessible through the one or more apertures, and an insertion portion. The method further comprises providing a connection mechanism; inserting the insertion portion into a grommet hole such that a portion of the grommet remains at a first side of the grommet hole; coupling the connection mechanism to the insertion portion when the connection mechanism is located at a second side of the grommet hole opposite the first side; and coupling a first device to the one or more electrical components through the one or more apertures.

A method for manufacturing an electrical device comprises providing a casing, wherein providing the casing comprises: providing a grommet comprising one or more first apertures and an insertion portion; and providing a connection mechanism configured to couple to the grommet. The method further comprises providing one or more electrical components to be located at least partially within the casing, and providing one or more electrical connectors to be located at least partially within the casing and to couple to the one or more electrical components. The insertion portion of the grommet can be removably placed in a grommet hole at a first side of the grommet hole, and when the grommet is at the first side of the grommet hole and the insertion portion is in the grommet hole, the grommet can be removably coupled to the connection mechanism at a second side of the grommet hole opposite the first side.

Turning now to the figures, FIGS. 1-4 illustrate different views of an exemplary electrical device 100, according to a first exemplary embodiment. It should be understood from the onset of this description of examples of embodiments that electrical device 100 is merely exemplary and is not limited to the exact embodiments presented, described, and shown herein. The functional aspects of electrical device 100 can be employed in many different devices, apparatuses, or systems, and in many different manners, methods, or steps not specifically depicted or otherwise described herein.

In the views shown among FIGS. 1-4, electrical device 100 comprises: a casing 105; one or more electrical components 130 located at least partially within casing 105; one or more electrical connectors 131 that can be located at least partially within casing 105; and one or more electrical conductors 138 electrically coupling electrical components 130 to electrical connectors 131. In one embodiment, electrical connectors 131 are capable of electrically coupling to foreign electrical devices (not shown). In an alternative embodiment, electrical connectors 131 can be part of, or integral with electrical components 130.

In one example, electrical device 100 facilitates inserting components 130 into a grommet hole 504 (FIG. 5) that is part of a table 370 (FIG. 5) while also allowing cables (not shown) to pass through grommet hole 504 (FIG. 5). Electrical device 100 can be inserted into grommet holes having varying depths and radii. For example, electrical device 100 comprising an insertion portion 117 can accommodate any sized grommet hole such that insertion portion 117 comprises a size to fit within grommet hole 504. Electrical device 100 further comprises a flange 115 comprising a size at least as large as grommet hole 504 so as to cover the perimeter of grommet hole 504. Those skilled in the art can appreciate that insertion portion 117 has a small enough diameter to fit within grommet hole 504 and other sizes of grommet holes, and flange 115 has a perimeter large enough to cover grommet hole 504 and other sizes of grommet holes.

Among various exemplary embodiments, table 370 (FIGS. 3-5) can comprise any piece of furniture comprising grommet hole 504. In the embodiments, table 370 comprises a first side 306, and a second side 407 opposite side 306. In one exemplary embodiment, table 370 comprises a desk, but table 370 can also comprise any other piece of furniture that can benefit from the present invention, for example, a counter top, an end table, a coffee table, a work bench, a chair, and the like.

Among the various exemplary embodiments described herein, electrical components 130 can comprise electrical circuitry for one or more electrical devices, systems, or components. In one exemplary embodiment, electrical components 130 comprises circuitry for a universal serial bus ("USB") hub. Among other exemplary embodiments, electrical components 130 comprises electronics for other electrical devices, such as a digital router, a digital music player, a direct current ("DC") or alternating current ("AC") power source, a power conditioner, a surge protector, a computer, a printer, a switch, a modem, a wireless access point, a data storage device, and any other like devices. The design and the manufacturing process for USB hubs and other electrical components are well-know in the art and will not be described in detail herein. Among some exemplary embodiments, electrical components 130 comprise a power indicator 139 capable of illumination or otherwise alerting a user when electrical components 130 are receiving power through one or more of electrical connectors 131.

Continuing with the exemplary embodiment of FIG. 1, electrical device 100 can comprise electrical conductors 138 that comprise wires, conductive material deposited on a semiconductor device or on a printed circuit board, or any other type of material capable of electrically coupling electrical components 130 to electrical connectors 131. As described herein "conductors" can refer to a single conductor, or two or more conductors, depending on the number of conductors used to electrically couple electrical components 130 to electrical connectors 131.

In an exemplary embodiment, electrical connectors 131 comprise six electrical connectors, 132, 133, 134, 135, 136, and 137. In this illustrated exemplary embodiment, three electrical connectors 132, 133, and 134 can be located at a first side of electrical components 130, and three electrical connectors 135, 136, and 137 can be located at a second side of electrical components 130. In this exemplary embodiment shown, the second side is opposite the first side. Among various other exemplary embodiments, though, any configuration with respect to quantity and position of electrical components and/or electrical connectors is contemplated by the present invention.

Among various exemplary embodiments, electrical connectors 131 comprise one or more USB connectors, and in some exemplary embodiments comprise at least one power connector. In one example, an electrical connector comprises a power connector 135, and electrical connectors 132, 133, 134, 136, and 137 comprise USB type connectors. In another exemplary embodiment, electrical connectors 131 comprises a power connector 135, electrical connectors 132, 133, 134, and 137 comprise USB type-A connectors, and electrical connector 136 comprises a USB type-B connector. In yet other exemplary embodiments, electrical connectors 131 comprise other types of USB connectors. In still yet another exemplary embodiment, electrical connectors 131 can comprise serial, parallel, FireWire, and any other type of electrical connectors.

As shown by the exemplary embodiment in FIG. 1, two or more of electrical connectors 132, 133, and 134 can be parallel to each other, as represented by apertures 112, 113, and 114, and electrical connector 136 can be perpendicular to electrical connector 137, as represented by apertures 147 and 148. Among various other exemplary embodiments, electrical connectors and apertures can comprise various other types of positioning. The electrical connectors and apertures can be parallel or perpendicular to another connector and aperture. The various electrical connectors and apertures can also be, at an angle, positioned above, positioned below, adjacent, opposite, in series, and any other like configuration. Moreover, those skilled in the art can appreciate that electrical connectors 131 are capable of electrically coupling electrical device 100 to one or more foreign electrical devices, components, or systems, and the electrical devices can be similar to or different from electrical device 100.

Still continuing with reference to the exemplary embodiment of FIG. 1, casing 105 comprises: a grommet 110 comprising one or more apertures 111; a gasket 120; a screen 140; and a connection mechanism 150 that can be coupled to grommet 110. Among some embodiments, screen 140 can be part of connection mechanism 150, but among other exemplary embodiments screen 140 can be part of grommet 110. In an exemplary embodiment, grommet 110 can comprise: flange 115; apertures 111; and insertion portion 117 that comprises a coupling mechanism 118. In one example, and as briefly mentioned above, insertion portion 117 comprises a diameter less than the diameter of grommet hole 504 (FIG. 5) to allow insertion of insertion portion 117 into grommet hole 504 (FIG. 5). In one embodiment, grommet hole 504 (FIG. 5) comprises a diameter in the range from about two to about three inches (approximately 5.1 to 7.6 centimeters), and the insertion region comprises a diameter slightly less than two inches (5.1 centimeters). In this embodiment, flange 115 is proximate to side 306 (FIG. 4) when insertion portion 117 is inserted into grommet hole 504 (FIG. 5). In this same embodiment, flange 115 comprises a diameter of about 3.4 inches (8.6 centimeters).

With reference to the exemplary embodiment described so far, apertures 111 can comprise apertures 112, 113, 114, 121, 122, and 123. In one embodiment, electrical connectors 132, 133, and 134 are accessible through and/or protrude from apertures 112, 113, and 114, respectively. In such an example, power indicator 139 can be visible through aperture 121. Moreover, apertures 122 and 123 provide conduits within casing 105 by which electrical cables (not shown) can pass through flange 115 when insertion portion 117 is inserted into grommet hole 504 (FIG. 5).

Among some exemplary embodiments, electrical device 100 comprises gasket 120. Gasket 120 can help deter unwanted movement of electrical device 100. Gasket 120 can be a circular ring having inner and outer diameters larger than the outer diameter of insertion portion 117 but smaller than the diameter of flange 115. In one embodiment, before inserting insertion portion 117 into grommet hole 504 (FIG. 5), gasket 120 is placed around insertion portion 117 such that gasket 120 is proximate the bottom of flange 115. In this embodiment, when insertion portion 117 is inserted into grommet hole 504 (FIG. 5), flange 115 abuts gasket 120, and gasket 120 abuts side 306, as shown in FIG. 4. In one exemplary embodiment, gasket 120 can be manufactured from a flexible, compressible material with high friction surfaces. For example, gasket 120 can be made from rubber or a soft, high friction surface plastic.

In the exemplary embodiments described herein, screen 140 can couple to electrical components 130 and electrical connectors 135, 136, and 137 to provide protection for electrical components 130 and electrical connectors 135, 136, and 137. In one embodiment, electrical connectors 135, 136, and 137 are accessible through or protrude from apertures 146, 147, and 148 in screen 140. In the same or a different embodiment, screen 140 can be coupled to insertion portion 117 to secure electrical connectors 131, electrical conductors 138, and electrical components 130 within casing 105. In one exemplary embodiment, screen 140 comprises two snaps 141 that can couple to mating holes (not shown) on the inside surface of insertion portion 117. Although, one exemplary embodiment describes snaps and mating holes, other securing devices to secure screen 140 to insertion portion 117 can be used.

Among the various exemplary embodiments described herein, in one example, connection mechanism 150 comprises at least one aperture 160, and connection mechanism 150 can comprise: a flange 155 with one or more optional springs 156; and a body portion 157 with a coupling mechanism 158. In one embodiment, electrical connectors 135, 136, and 137 are accessible through or protrude from aperture 160 at side 407 of table 305 (FIG. 4). In one embodiment, the interior diameter of aperture 160 is larger than the exterior diameter of insertion portion 117 to allow a portion of insertion portion 117 to insert into aperture 160. Furthermore, flange 155 comprises an outer diameter larger than the diameter of grommet hole 504 (FIG. 5) to prevent connection mechanism 150 from receding into grommet hole 504 (FIG. 5). In one example, flange 115 comprises a diameter of about 3.4 inches (8.6 centimeters).

In one exemplary embodiment of the present invention, insertion portion 117 can be positioned within grommet hole 504 (FIG. 5). When insertion portion 117 is inside grommet hole 504 (FIG. 5), grommet 110 can be coupled to connection mechanism 150 proximate to side 407. FIG. 2 illustrates an example of electrical device 100 after grommet 110 has been coupled to connection mechanism 150. In one embodiment, grommet 110 can be coupled to connection mechanism 150 by engaging coupling mechanism 118 with coupling mechanism 158.

In the illustrated exemplary embodiment of FIGS. 1-4, coupling mechanism 118 comprises two or more substantially horizontal grooves 119 and a vertical groove 125. Coupling mechanism 158 can comprise at least one protrusion 159. To engage coupling mechanism 118 with coupling mechanism 158, insertion portion 117 is inserted into aperture 160. When protrusion 159 aligns with vertical groove 125, grommet 110 and connection mechanism 150 can collapse toward each other until connection mechanism 150 is proximate side 407, and grommet 110 or gasket 120 is proximate side 306. If when insertion portion 117 is inserted into aperture 160 and protrusion 159 does not align with vertical groove 125, then coupling mechanism 118 and coupling mechanism 158 cannot engage one another, and grommet 110 and connection mechanism 150 can be rotated relative to one another until protrusion 159 and vertical groove 125 are aligned. Once protrusion 159 aligns with vertical groove 125, and grommet 110 and connection mechanism 150 collapse toward each other as described above, connection mechanism 150 can be rotated in a first circular direction in relation to grommet 110 to engage protrusion 159 with horizontal groove 119. For example, protrusion 159 slides into one of horizontal grooves 119. In one embodiment, the first circular direction is clockwise, however, other exemplary embodiments can comprise a configuration where the circular direction is counter-clockwise.

In the exemplary embodiment described above, coupling mechanism 118 and the corresponding groove structure is illustrated as part of insertion portion 117, and coupling mechanism 158 comprising protrusion 159 is illustrated as part of connection mechanism 150. In other exemplary embodiments, though, the reverse configuration is contemplated by the present invention, that is, connection mechanism 150 can comprise the groove structure, and insertion portion 117 can comprise the protrusion. Any other groove and protrusion configurations are similarly contemplated by this disclosure, as well, as any other engaging mechanisms that can function to secure grommet 110 to connection mechanism 150.

Continuing with the exemplary embodiment as illustrated in FIG. 1, by engaging protrusion 159 with one of horizontal grooves 119, grommet 110 effectively locks to connection mechanism 150. In some examples, horizontal grooves 119 further comprise small tabs to help hold protrusion 159 in one of horizontal grooves 119. While the exemplary embodiment described herein discusses protrusion 159 engaged with horizontal grooves 119 to secure the position of grommet 110 with connection mechanism 150, any other type of securing mechanism that can secure grommet 110 with connection mechanism 150 is contemplated by this disclosure. For example, hooks, tabs, glues, screws, pins, springs, cavities, ties, snaps, and the like are contemplated by this disclosure.

In some exemplary embodiments, gasket 120 and springs 156 can be used to provide a more stable and a tighter coupling of grommet 110 to connection mechanism 150. The compressibility of gasket 120 and springs 156 help align protrusion 159 with one of horizontal grooves 119 by providing flexibility to where gasket 120 and connection mechanism 150 abut sides 306 and 407 (FIG. 4), respectively. Springs 156 as described herein can be cantilevered arm type springs, however, any other type of spring, such as coiled, toroid, and the like are contemplated by this disclosure.

In an exemplary embodiment, when insertion portion 117 resides within grommet hole 504 (FIG. 5) and grommet 110 is coupled to connection mechanism a first one of electrical connectors 132, 133, and 134 are accessible through apertures 111 at side 306.

Among the various exemplary embodiments described herein, casing 105 can be preferably made of a material that is tough, hard, and rigid, has good chemical resistance and dimensional stability, exhibits good creep resistance, and is relatively strong and inexpensive. Accordingly, casing 105 can be constructed of acrylonitrile butadiene styrene (ABS), polycarbonate, polypropylene, polyethylene, or a similar material, all of which, to varying degrees, exhibit the stated properties. In one embodiment, casing 105 is made using an injection molding process, however, other molding processes can be used. Injection molding processes for creating plastic casings are well-known in the art and will not be described herein.

Figure 6:
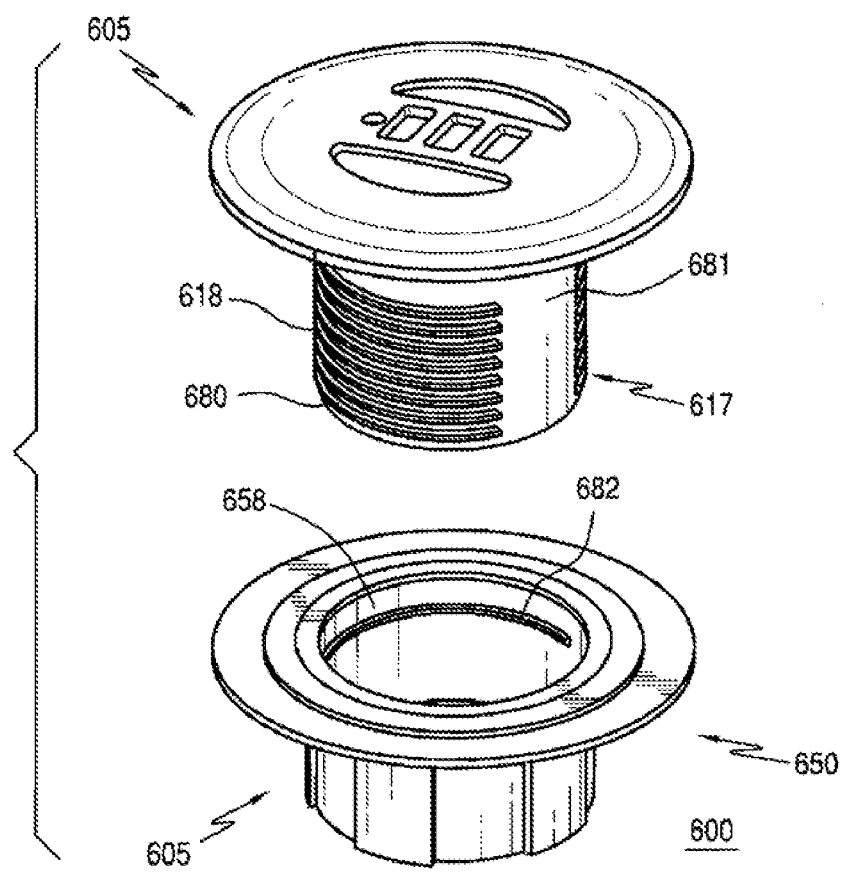
FIG. 6 illustrates an exploded view of an electrical device, according to a second embodiment.

Turning now to FIG. 6, FIG. 6 illustrates an exploded view of an electrical device 600, according to a second embodiment. In this embodiment, casing 605 does not include a gasket or springs. Top portion 617 comprises a coupling mechanism 618 and connection mechanism 650 comprises a coupling mechanism 658.

In the embodiment shown in FIG. 6, coupling mechanism 618 comprises two or more partially threaded regions 680 separated by non-threaded regions 681. In one example, the diameter of partially threaded regions 680 is larger than the diameter of the non-threaded regions 681. In some embodiments, the diameter of partially threaded regions 680 is larger than the diameter of non-threaded regions 681 by the thickness of the threads in partially threaded regions 680. Coupling mechanism 658 of connection mechanism 650 can comprise a full thread 682. In this embodiment, coupling mechanism 618 couples to coupling mechanism 658 by coupling partially threaded regions 680 to full thread 682 in a screw-like manner. The exemplary electrical device 600 can be used with or without a gasket. In another embodiment, coupling mechanism 618 can comprise full threads, and coupling mechanism 658 can comprise partial threads. In a further embodiment, coupling mechanisms 618 and 658 can comprise the same type of threads.

It can be appreciated by those skilled in the art that the exemplary embodiment shown in FIG. 6 can also comprise other features described herein of the embodiment shown in FIG. 1. For example, electrical device 600 can comprise electrical components similar to the electrical components 130 of electrical device 100. Electrical device 600 can further comprise electrical connectors, a power indicator, and electrical conductors similar to electrical connectors 131, power indicator 139, and electrical conductors 138 of electrical device 100. The other elements described with respect to electrical device 100 can be incorporated into electrical device 600, as well as other exemplary embodiments contemplated by this disclosure.

Figure 7:
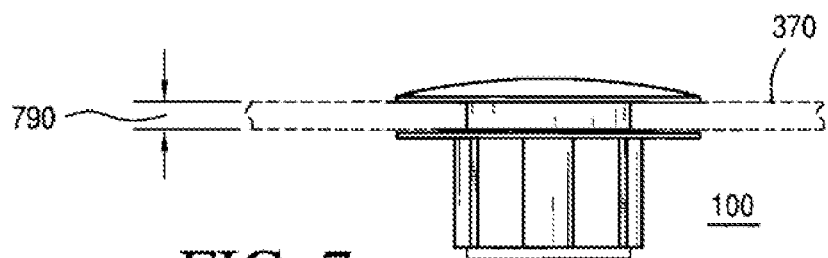
FIG. 7 illustrates the electrical device according to the first embodiment configured for use with the table having a first thickness.
Figure 8:
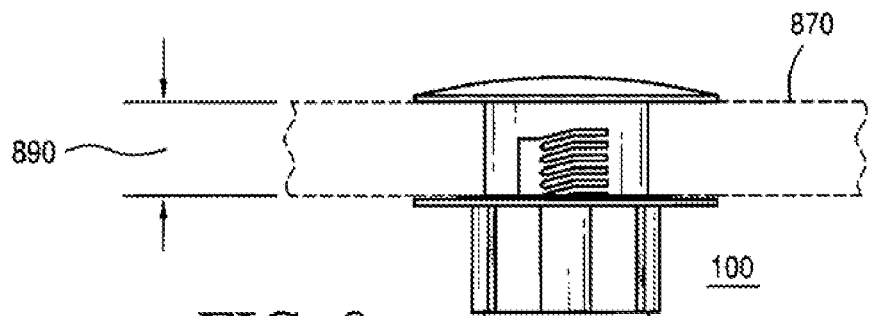
FIG. 8 illustrates the electrical device according to the first embodiment configured for use with a table having a second thickness.
Figure 9:
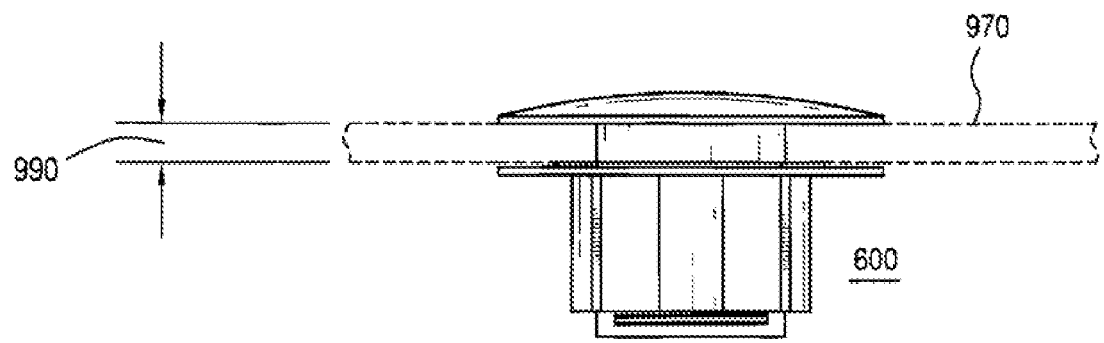
FIG. 9 illustrates the electrical device according to the second embodiment configured for use with a table having a third thickness.
Figure 10:
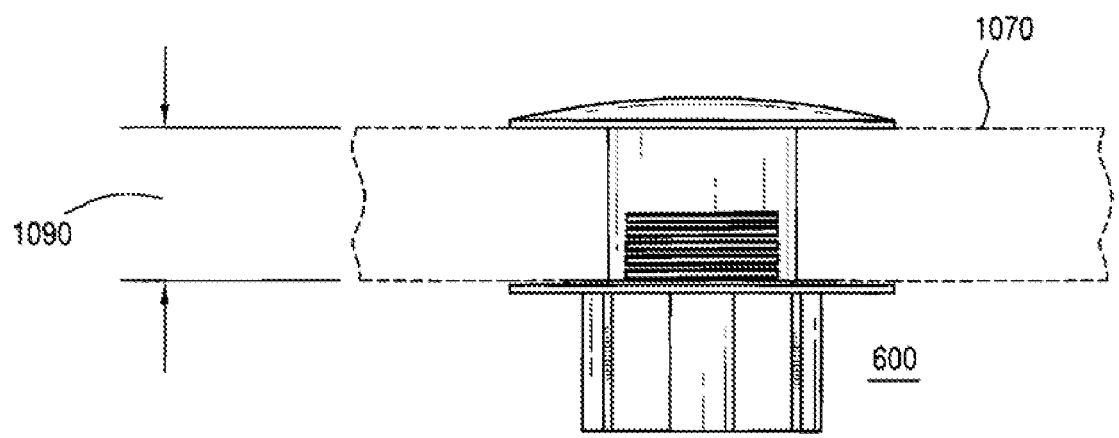
FIG. 10 illustrates the electrical device according to the second embodiment configured for use with a table having a fourth thickness.

In an exemplary embodiment, FIG. 7 illustrates electrical device 100 configured for use with table 370 having a first thickness 790, and FIG. 8 illustrates electrical device 100 configured for use with a table 870 having a second thickness 890. In another exemplary embodiment, FIG. 9 illustrates electrical device 600 configured for use with table 970 having a third thickness 990, and FIG. 10 illustrates electrical device 600 configured for use with a table 1070 having a fourth thickness 1090. Electrical device 600 can also be used with tables 370 and 870, and electrical device 100 can also be used with tables 970 and 1070.

Figure 11:
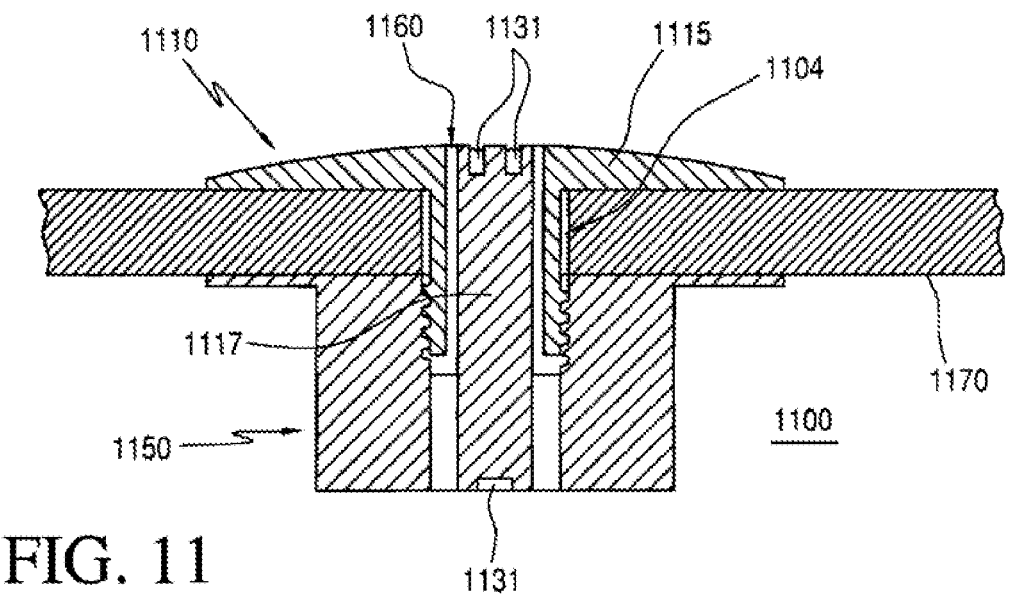
FIG. 11 illustrates a cross-section view of an electrical device according to a third embodiment.

In an alternate embodiment of an electrical device, FIG. 11 illustrates electrical device 1100 comprising a grommet 1110 comprising an aperture 1160, and a connection mechanism 1150 comprising an insertion portion 1117. This exemplary embodiment can be an opposite configuration of exemplary embodiment 100 described hereinabove. Instead of the grommet comprising an insertion portion that inserts into a grommet hole from a first side, this embodiment contemplates the insertion portion as part of the connection mechanism, and the connection mechanism couples with the grommet by inserting the insertion portion into a grommet hole from a first side. In this exemplary embodiment, grommet 1110 still comprises a flange 1115 similar to flange 115 of grommet 100, and flange 1115 functions correspondingly to cover the perimeter of a grommet hole 1104 in a table 1170. This exemplary embodiment further comprises electrical connectors 1131 similar to electrical connectors 131 of electrical device 100. Other elements described herein with respect to other electrical device embodiments are likewise contemplated for this exemplary embodiment. For example, electrical device 1100 can also have apertures similar to apertures 122 and 123 in electrical device 100 in FIG. 1.

Among the various electrical devices described herein, the electrical devices have been shown comprising a circular configuration to accommodate a circular grommet hole. The present invention, though, contemplates, other shape or decorative configurations to accommodate other grommet hole configurations. For example, electrical devices and grommet holes comprising square, octagonal, oval, hexagonal, and any other regular or irregular shape configuration are likewise contemplated by this disclosure.

Among the various electrical devices described herein, the electrical devices are configured for use with any table or like structure that comprises an aperture or grommet hole for the various exemplary electrical devices described herein to fit or couple within. For example, other structures such as a desk, bench, shelf, and the like are contemplated by this disclosure. Moreover, the thickness of any table or like structure can vary to any degree that will allow the electrical device to be used as described.

Figure 12:
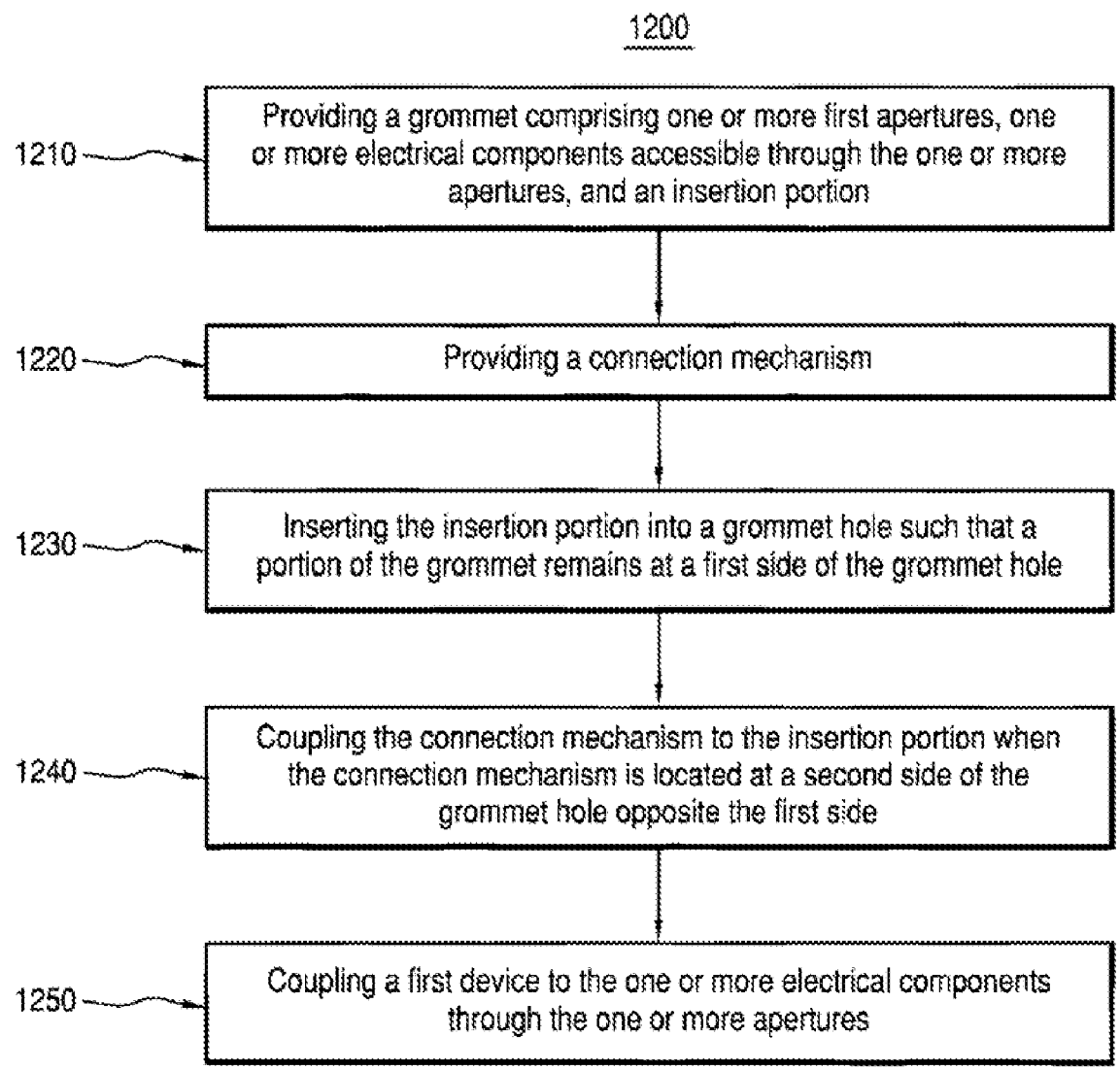
FIG. 12 illustrates a flow chart providing an exemplary manner to use an electrical device.

Turning now to an exemplary method for using an electrical device, and as outlined in the flow chart of FIG. 12, the method 1200 comprises: providing a grommet comprising one or more first apertures, one or more electrical components accessible through the one or more apertures, and an insertion portion (a block 1210); providing a connection mechanism (a block 1220); inserting the insertion portion into a grommet hole such that a portion of the grommet remains at a first side of the grommet hole (a block 1230); coupling the connection mechanism to the insertion portion when the connection mechanism is located at a second side of the grommet hole opposite the first side (a block 1240); and coupling a first device to the one or more electrical components through the one or more apertures (a block 1250). Among various embodiments, when the connection mechanism couples to the insertion portion (block 1240) in the grommet hole, a distance between a flange of the connection mechanism and a flange of the grommet is substantially similar to a depth of the grommet hole. Further more, when coupling the connection mechanism to the insertion portion (block 1240), the method can comprise engaging a locking mechanism to secure the insertion portion to the connection mechanism, and when engaging the locking mechanism, the engaging can comprise aligning a protrusion at an interior portion of the connection mechanism with a groove at an exterior portion of the insertion portion; and rotating one of the connection mechanism or the insertion portion relative to the other one of the connection mechanism and the insertion portion such that the protrusion is positioned within the groove.

Among the various method of use embodiments, when coupling the first device (block 1250), the first device can couple to the one or more components through the one or more apertures at the first side of the grommet hole. In an alternate embodiment, the first device couples to the one or more components through the one or more apertures at the second side of the grommet hole. In still yet another embodiment, the method 1200 comprises coupling a second device to one or more components through a second one of the one or more apertures at the first side of the grommet hole.

In an exemplary embodiment of the present invention, a method 1300 for manufacturing an electrical device comprises: providing a casing (a block 1310), wherein providing the casing comprises providing a grommet comprising one or more first apertures and an insertion portion (a block 1312), and providing a connection mechanism configured to couple to the grommet (a block 13114). The method 1300 further comprises providing one or more electrical components to be located at least partially within the casing (a block 1320); and providing one or more electrical connectors to be located at least, partially within the casing and to couple to the one or more electrical components (a block 1330). The insertion portion of the grommet can be removably placed in a grommet hole at a first side of the grommet hole, and when the grommet is at the first side of the grommet hole and the insertion portion is in the grommet hole, the grommet can be removably coupled to the connection mechanism at a second side of the grommet hole opposite the first side.

Figure 13:
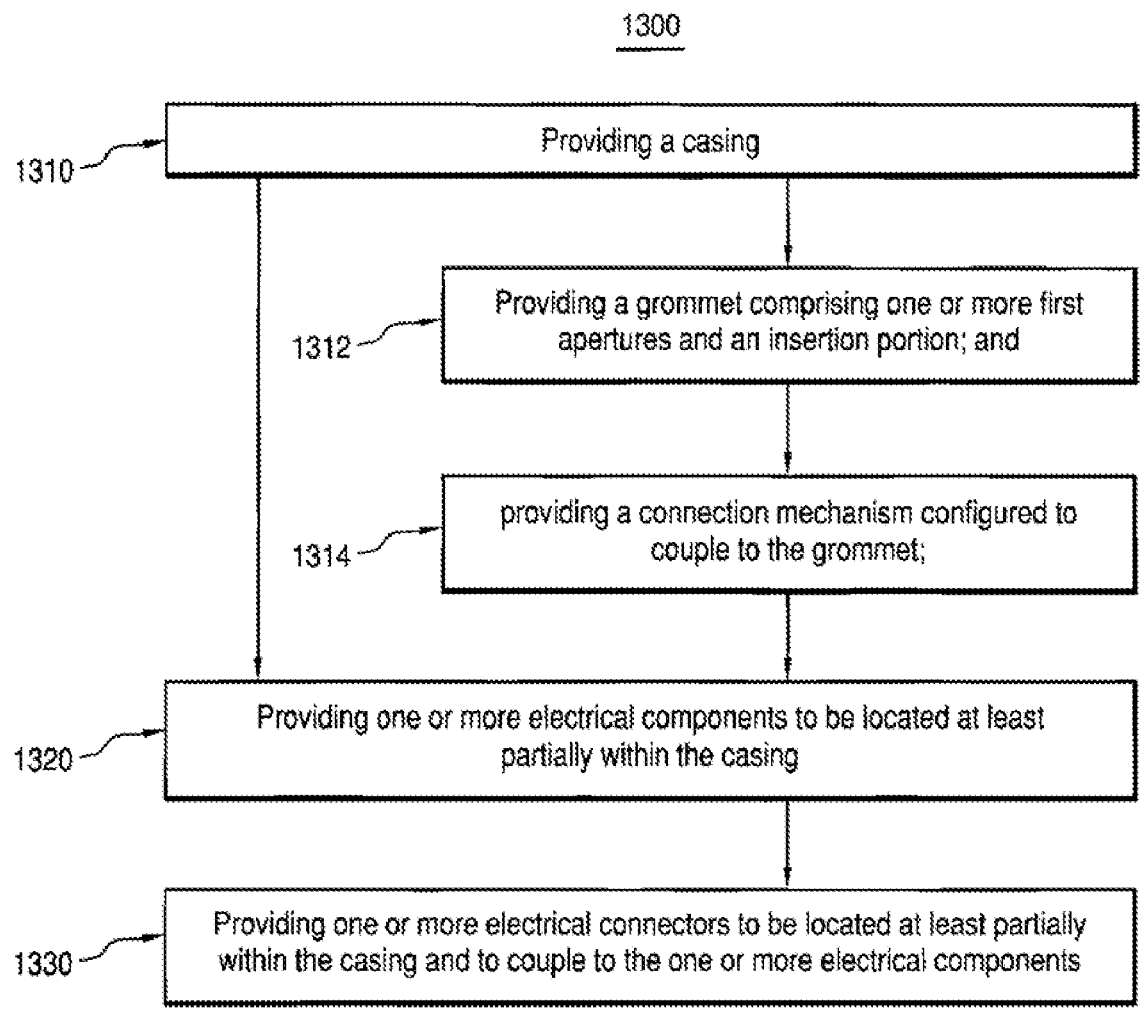
FIG. 13 illustrates a flow chart providing an exemplary manner to manufacture an electronic device.

Although a particular order of actions are illustrated in FIGS. 12 and 13, these actions can be performed in other temporal sequences. For example, two or more actions depicted in FIGS. 12 and 13 can be appropriately performed sequentially, concurrently, or simultaneously. Moreover, among the various methods of use and manufacture described herein, the electrical device elements referred to can be similar to the exemplary embodiments of the physical exemplary elements and embodiments described earlier. For example, the insertion portion described in methods 1200 and 1300 can be similar to insertion portion 117 (FIGS. 1-2), 617 (FIG. 6) and 1117 (FIG. 11), connection mechanism can be similar to connection mechanism 150 (FIGS. 1-2), 650 (FIG. 6) and 1150 (FIG. 11), electrical components can be similar to electrical components 130 (FIG. 1), and so forth.

It is intended that the scope of the invention shall be limited only to the extent required by the claims. For example, to one of ordinary skill in the art, it will be readily apparent that the device discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment of the invention, and may disclose alternative embodiments of the invention.

All elements claimed in any particular claim are essential to the electrical grommet device claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An electrical device for attachment to a work surface having a grommet hole, the electrical device comprising:
   a casing comprising:
      a grommet comprising a top surface with a plurality of first apertures and an insertion portion; and
      a connection mechanism capable of being coupled to the grommet;
   one or more electrical components located at least partially within the casing; and
   one or more electrical connectors located at least partially within the casing and coupled to the one or more electrical components,
   wherein:
      the insertion portion of the grommet can be placed in a grommet hole from a first side of the grommet hole; and
      when the top surface of the grommet is at the first side of the grommet hole and the insertion portion is in the grommet hole, the grommet can be rotatably coupled in a mating direction to the connection mechanism at a second side of the grommet hole opposite the first side.

2. The electrical device of claim 1, wherein when the grommet is at the first side of the grommet hole and the insertion portion is in the grommet hole and the grommet is removably coupled to the connection mechanism at the second side of the grommet hole, at least a first one of the one or more electrical connectors is accessible through the one or more first apertures at the first side of the grommet hole.

3. The electrical device of claim 2 wherein:
the connection mechanism comprises one or more second apertures; and
at least a second one of the one or more electrical connectors is accessible through the one or more second apertures at the second side of the grommet hole.

4. The electrical device of claim 2, wherein:
the connection mechanism comprises one or more second apertures; and
second and third ones of the one or more electrical connectors are accessible through the one or more second apertures at the second side of the grommet hole; and
the second one of the one or more electrical connectors is perpendicular to the third one of the one or more electrical connectors.

5. The electrical device of claim 1, wherein when the grommet is at the first side of the grommet hole and the insertion portion is in the grommet hole and the grommet is removably coupled to the connection mechanism at the second side of the grommet hole, at least a first one of the one or more electrical connectors is accessible through the one or more first apertures at the second side of the grommet hole.

6. The electrical device of claim 5, wherein:
the connection mechanism comprises one or more second apertures; and
at least a second one of the one or more electrical connectors is accessible through the one or more second apertures at the first side of the grommet hole.

7. The electrical device of claim 5, wherein:
the connection mechanism comprises one or more second apertures; and
second and third ones of the one or more electrical connectors are accessible through the one or more second apertures at the first side of the grommet hole; and
the second one of the one or more electrical connectors is perpendicular to the third one of the one or more electrical connectors.

8. The electrical device of claim 1, wherein:
the electrical device is a universal serial bus hub.

9. The electrical device of claim 1, wherein:
the one or more electrical connectors are universal serial bus connectors.

10. The electrical device of claim 1, wherein:
the grommet further comprises a first coupling mechanism;
the connection mechanism comprises a second coupling mechanism; and
the connection mechanism is coupled to the grommet by coupling the second coupling mechanism to the first coupling mechanism.

11. The electrical device of claim 1, wherein:
the one or more electrical connectors comprise a first connector and a second connector; and
the first connector is parallel to the second connector.

12. A connectivity system for an attachment to a desk having a surface containing an aperture, the connectivity system comprising:
a connection mechanism configured to be located entirely below the aperture and comprising a collar having an interior region; and
a connection hub capable of being inserted into the aperture and rotatably attached to the interior region of the collar, wherein at least a portion of the connection hub is located above the aperture, and comprising:
a top region having a surface with a plurality of openings;
a bottom region opposite to the top region;
a first connection port located at the top region; and
a second connection port located at the bottom region, wherein the connectivity system can be used with desks of different thickness.

13. The connectivity system of claim 12 wherein:
the connectivity system is capable of use in a second aperture in a second surface of a second desk; and
the second aperture is larger than the first aperture.

14. The connectivity system of claim 12 wherein:
the connection mechanism further comprises a flange configured to be located under the surface of the desk.

15. The connectivity system of claim 14, wherein the flange comprises a perimeter greater than a perimeter of the aperture.

16. The connectivity system of claim 12 wherein:
the connection hub is a USB hub.

17. The connectivity system of claim 12 wherein:
the aperture in the surface of the desk comprises a perimeter; and
the connection hub comprises a flange configured to be located over the perimeter.

18. The connectivity system of claim 17 wherein:
the connection hub comprises a flange larger than the aperture and configured to be located over all of the perimeter.

19. The connectivity system of claim 12 wherein:
the connection hub is a 5-port USB hub.

20. The connectivity system of claim 19 wherein:
the 5-port USB hub comprises:
four USB A connectors; and
one USB B connector;
the first connection port is a first one of the four USB A connectors; and
the second connection port is a second one of the four USB A connectors.

21. The connectivity system of claim 20 wherein:
the one USB B connector and the second one of the four USB A connectors are located at the bottom region; and
the one USB B connector is perpendicular to the second one of the USB A connectors.

22. The connectivity system of claim 12 wherein:
the first connection port is accessible from above the surface of the desk; and
the second connection port is accessible from underneath the surface of the desk.

23. The connectivity system of claim 12 further comprising:
a power port located at the bottom region.

24. The connectivity system of claim 12 wherein:
the connectivity system is capable of use in a second aperture in a second surface of a second desk;
the surface of the desk has a first thickness;
the aperture extends through the first thickness;
the second surface of the second desk has a second thickness greater than the first thickness; and
the second aperture extends through the second thickness.

25. The connectivity system of claim 12 wherein:
the connection mechanism and the connection hub are configured to be used with different sized apertures in different desks.

26. The connectivity system of claim 12 wherein:
the connection mechanism and the connection hub are configured to be used with desks having different surface thicknesses.

27. The connectivity system of claim 12 wherein:
the connection hub and the connection mechanism comprise different portions of a cam lever.

28. The connectivity system of claim 12 wherein:
the connection hub comprises partial threads; and
the connection mechanism comprises a full thread.

29. The connectivity system of claim 12 wherein:
the connection hub comprises partial threads; and
the connection mechanism comprises a single thread.

30. The connectivity system of claim 12 wherein:
the connection mechanism comprises a flange; and
the flange comprises a spring.

31. The connectivity system of claim 30 wherein:
the connection mechanism is configured to be located underneath the surface; and
the spring is configured to push the flange away from the surface.

32. The connectivity system of claim 12 wherein:
the connection mechanism and the connection hub define at least one connectivity system aperture located within and extending through the aperture of the desk.

33. The connectivity system of claim 32 wherein:
the at least one connectivity system aperture is two connectivity system apertures.

34. The connectivity system of claim 32 wherein:
the at least one connectivity system aperture comprises two connectivity system apertures; and
the two connectivity system apertures are located at opposite sides of the connection hub.

35. The connectivity system of claim 32 wherein:
the at least one connectivity system aperture comprises two connectivity system apertures; and
the first and second connection ports are located between the two connectivity system apertures.

\* \* \* \* \*

UNITED STATES PATENT AND TRADEMARK OFFICE
CERTIFICATE OF CORRECTION

PATENT NO. : 7,806,723 B2
APPLICATION NO. : 11/969607
DATED : October 5, 2010
INVENTOR(S) : Joseph Chong, Yoko Iida and Kenneth Mori It is certified that error appears in the above-identified patent and that said Letters Patent is hereby corrected as shown below:

Cover page, item [60] entitled "Related U.S. Application Data", insert --U.S. Patent Application No. 11/127,336, filed on May 11, 2005.--.

Signed and Sealed this

Seventh Day of December, 2010

David J. Kappos
*Director of the United States Patent and Trademark Office*